United States Patent [19]

Storm

[11] Patent Number: 5,369,662
[45] Date of Patent: Nov. 29, 1994

[54] REDUCTION OF PARASITIC LASING

[75] Inventor: Mark E. Storm, Seaford, Va.

[73] Assignee: The United States of America as represented by the Administrator of the National Aeronautics and Space Administration, Washington, D.C.

[21] Appl. No.: 105,528

[22] Filed: Aug. 11, 1993

[51] Int. Cl.⁵ .......................... H01S 3/10; H01S 3/11
[52] U.S. Cl. ......................... 372/99; 372/12; 372/25
[58] Field of Search .............. 372/10, 12, 99, 25

[56] References Cited

U.S. PATENT DOCUMENTS 5,018,152  5/1991  Linne et al. .................... 372/25

*Primary Examiner*—Rodney B. Bovernick
*Assistant Examiner*—Robert McNutt
*Attorney, Agent, or Firm*—Kimberly A. Chasteen

[57] ABSTRACT

A technique has been developed which carefully retro-reflects precisely controlled amounts of light back into a laser system thereby intentionally forcing the laser system components to oscillate in a new resonator called the parasitic oscillator. The parasitic oscillator uses the laser system to provide the gain and an external mirror is used to provide the output coupling of the new resonator. Any change of gain or loss inside the new resonator will directly change the lasing threshold of the parasitic oscillator. This change in threshold can be experimentally measured as a change in the absolute value of reflectivity, provided by the external mirror, necessary to achieve lasing in the parasitic oscillator. Discrepancies between experimental data and a parasitic oscillator model are direct evidence of optical misalignment or component performance problems. Any changes in the optical system can instantly be measured as a change in threshold for the parasitic oscillator. This technique also enables aligning the system for maximum parasitic suppression with the system fully operational.

3 Claims, 7 Drawing Sheets

REDUCTION OF PARASITIC LASING

ORIGIN OF THE INVENTION

The invention described herein was made during the performance of work under NASA Contract NAS1-18460 and is subject to the provisions of Public Law 96-517. In accordance with 35 USC 202, the contractor did not elect to retain title.

BACKGROUND OF THE INVENTION

1. Technical Field of the Invention

The present invention relates generally to lasers and more particularly to quantification, reduction and elimination of parasitic lasing.

2. Discussion of the Related Art

The efficiency and lifetime of a high gain laser can be limited by parasitic lasing, which is unwanted lasing that can develop between any optical surfaces in the system. Polarization rotating devices such as waveplates and electro-optic components can also dramatically affect the circulating optical power of the parasitic lasing. The lasing is termed "parasitic" because it is uncontrolled lasing which depletes the gain, thereby making the laser less efficient. This unwanted stimulated emission is also important to identify and eliminate because the same optical surfaces which participate in parasitic lasing, can cause catastrophic optical damage to the laser optics. In Q-switched lasers, for example, light which retro-reflects back into the laser will typically destroy the optical coatings and surfaces.

Parasitic lasing is different from amplified spontaneous emission (ASE). Amplified spontaneous emission generally refers to amplified fluorescence inside of a laser rod or slab. The gain inside the laser medium becomes so high, that the amplified fluorescence decreases the upper laser level population via stimulated emission, thereby depleting the gain. Both parasitic lasing and ASE can greatly reduce laser efficiency, but parasitic lasing can cause optical damage, and will be spectrally bright and propagate with a small beam divergence. These features of parasitic lasing make it particularly harmful for lidar applications. Several orders of magnitude of parasitic protection may be gained using this controlled-feedback technique.

Oscillator models have been developed which use the measured values of reflectivity, the system's small-signal-gain, passive and active losses, and resonator configuration to quantify parasitic lasing. This technique is primarily useful for parasitic lasing along the optical axis of a laser system; ASE or parasitic lasing transverse to the optic axis can potentially be identified but not fully characterized using this retroreflection technique. Previous work on parasitic lasing has focused on parasitic lasing only within the laser crystal, typically a Neodymium doped disk or slab.

It is accordingly an object of the present invention to provide a method for quantifying parasitic lasing.

It is a further object of the present invention to provide a method for eliminating parasitic lasing.

It is yet another object of the present invention to accomplish the foregoing objects in a simple manner.

Additional objects and advantages of the present invention are apparent from the drawings and specification that follow.

SUMMARY OF THE INVENTION

A device for reducing, eliminating or quantifying parasitic lasing in a high gain laser system includes a reflecting means for reflecting a controlled, quantifiable amount of the emitted light back into the laser system. This causes a parasitic oscillation in the laser system. Gain of the laser system is measured. The reflecting means may consist of an optical mirror and an optical attenuating device or may be a continuously variable reflector. The steps followed to reduce or eliminate parasitic lasing in a laser system include calibrating a continuously variable reflector, optically aligning the laser system, adjusting the laser system gain such that no parasitic lasing is detected, setting the continuously variable reflector at a minimum reflectivity, retro-reflecting light into the laser system, aligning the retro-reflected light, increasing the reflectivity of the continuously variable reflector until a single laser spike is observed on an optical light detector, simultaneously adjusting the continuously variable reflector and the gain of the laser system such that reflectivity of the continuously variable reflector is minimized, and optically adjusting the laser system optics to maximize the reflectivity of the continuously variable reflector while maintaining a low light level on the optical light detector. If quantification of the parasitic lasing is required the final step is continued until the reflectivity of the continuously variable reflector at least meets the reflectivity of a reflector in an analytical oscillator model.

DETAILED DESCRIPTION OF THE INVENTION

A unique method for measuring, quantifying and eliminating parasitic lasing is described in detail below. The method is generally applicable to any laser system with high round-trip gains. Round-trip gains in the $10^9$ range are not uncommon for Q-switched, 1.5–2.0 joule Nd:YAG lasers and have been measured using this method. Coherent and short pulsewidth systems which pulse shape and amplify cw lasers into the 100 mJ energy range also require very high optical gain. These systems are difficult to align and very susceptible to parasitic lasing.

Figure 1:
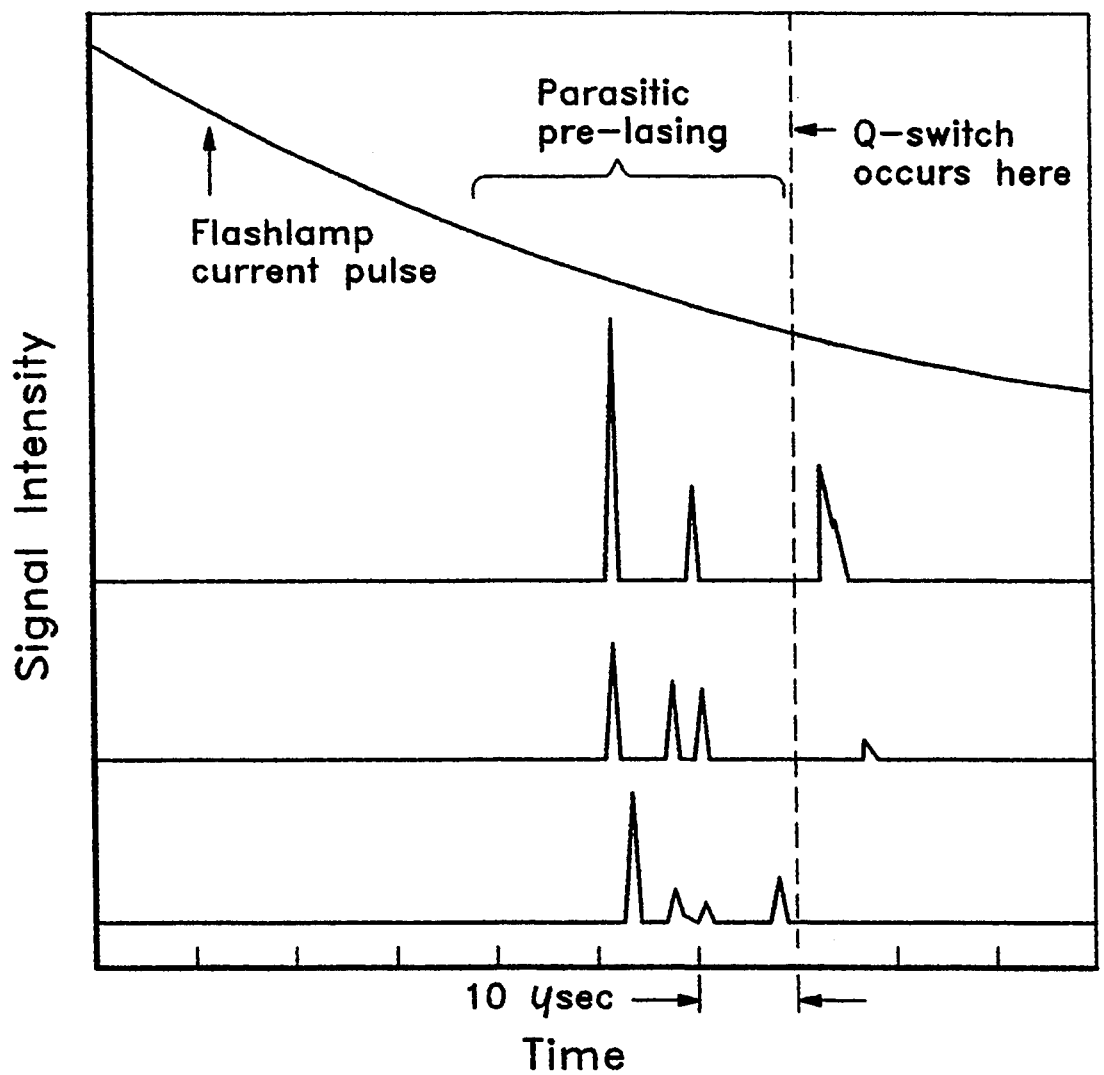
FIG. 1 is a graph showing parasitic lasing.

Parasitic lasing is typically observed as relaxation oscillations seen on a time-resolved optical detector. It occurs before the main Q-switched spike or designated timing event during gain build-up. For Q-switched lasers, parasitic lasing would show-up as prelasing before the Q-switch is open during the optical excitation/energy storage process. FIG. 1 shows this characteristic signature.

The method involves retro-reflecting precisely controlled amounts of light back into the laser system thereby intentionally forcing the laser system's components to oscillate in a new resonator called the "parasitic oscillator." The new parasitic oscillator uses the laser system to provide the gain and the high reflecting mirror. An external mirror is used to provide the output coupling of the parasitic oscillator. Any change of gain or loss inside this parasitic oscillator will directly change the lasing threshold of the parasitic oscillator. This change in threshold can be experimentally measured as a change in the absolute value of reflectivity, provided by the external mirror, necessary to achieve lasing in the parasitic oscillator.

The alignment of all components inside the parasitic oscillator affect the threshold; particularly polarization components such as a Q-switch or a Faraday Isolator which control the amount of circulating optical power. The retro-reflection technique enables the laser system to be dynamically optimized for parasitic suppression by maximizing the external reflectivity necessary for threshold. The contribution of passive optical surface reflectivities on parasitic lasing is easily evaluated and minimized. On-axis reflections inside the laser system will dramatically reduce the external reflectivity necessary for threshold. By modeling the parasitic oscillator and knowing precisely the reflectivity of the external mirror, large deviations from the model can be directly attributed to problems inside the laser system. The parasitic oscillator model and controlled retro-reflection technique can be used to identify problem areas, verify component performance, optimize the system's optical alignment, and predict the parasitic consequences of changes to the optical system.

Figure 2:
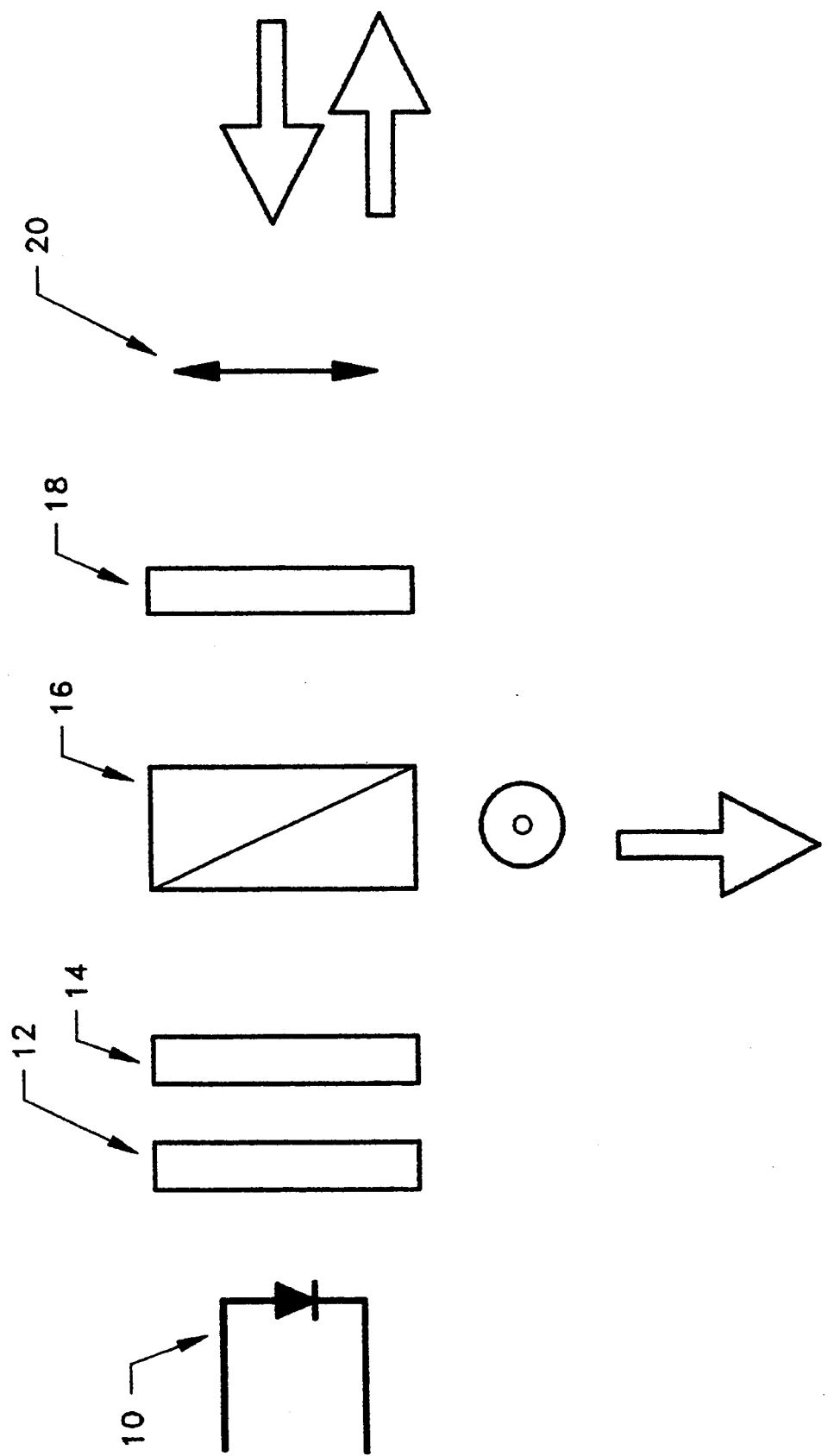
FIG. 2 is a diagram of the continuously variable reflector.

Retro-reflecting light back into a high gain laser system is usually catastrophic to the optical system and contrary to conventional wisdom. Great care must be taken to properly implement this retro-reflection. Instant optical damage will result if too much energy is retro-reflected thereby destroying the laser's optical components. Critical to the success of this technique was the development of a Continuously Variable Reflector (CVR). The CVR must hold its optical alignment, be continuously tunable, and operate over a wide dynamic range of reflectivity from $10^{-7}$ to $10^{-2}$. Induced parasitic lasing should not be allowed to exceed micro-joules of lasing energy. The CVR is the variable reflectivity output coupler for the induced parasitic oscillator (see FIG. 2). The reflectivity must be continuously variable between $10^{-2}$ and $10^{-7}$. It uses a polarization scheme which gives this device tunable reflectivity over nearly 3 decades. A mirror 12, ¼ waveplate 14 and polarizer 16 make up the basic tunable portion of this reflector. The reflectivity of the device is given by:

$$R_{CVR} = R_m T_l^2 T_f^2 T(\text{polarization}) \quad (1)$$

where

T(polarization) = $\cos^2 2A$

A = angle between input polarization and fast optic axis $R_m$ = mirror reflectivity $T_l$ = where -L represents the passive losses $T_f$ = transmission of the ND filter The neutral density filter 18 is used to select the reflectivity range since the CVR's upper limit will be determined by the double-pass transmission of the polarizer 16, waveplate 14 and reflector 12 combination. The lower limit of reflectivity is determined by on-axis optical scatter and the Lambertian component of specular reflection from the non-normal surfaces of the CVR. Reflectivities ranging from 1.0 to $10^{-8}$ are achievable in practice.

The basic reflectivity of the device is provided by the mirror 12. The polarizer 16 and waveplate 14 combination act as a variable attenuator by rotating the polarization by different amounts depending on the ¼ waveplate 14 orientation. When the waveplate's 14 fast or slow optical axis is parallel with the light transmitted by the polarizer 16, no polarization rotation occurs as the light travels through the device; the reflectivity is then at a maximum, which is essentially the same as the mirror 12 except for passive losses. As the waveplate 14 is rotated, the polarization is rotated at twice the angle as indicated in eq. 1; hence, the fraction of light transmitted by the polarizer 16 decreases. The minimum reflectivity is reached when the light becomes rotated by 90 degrees causing the polarizer 16 to reflect the light away from the laser.

Figure 3:
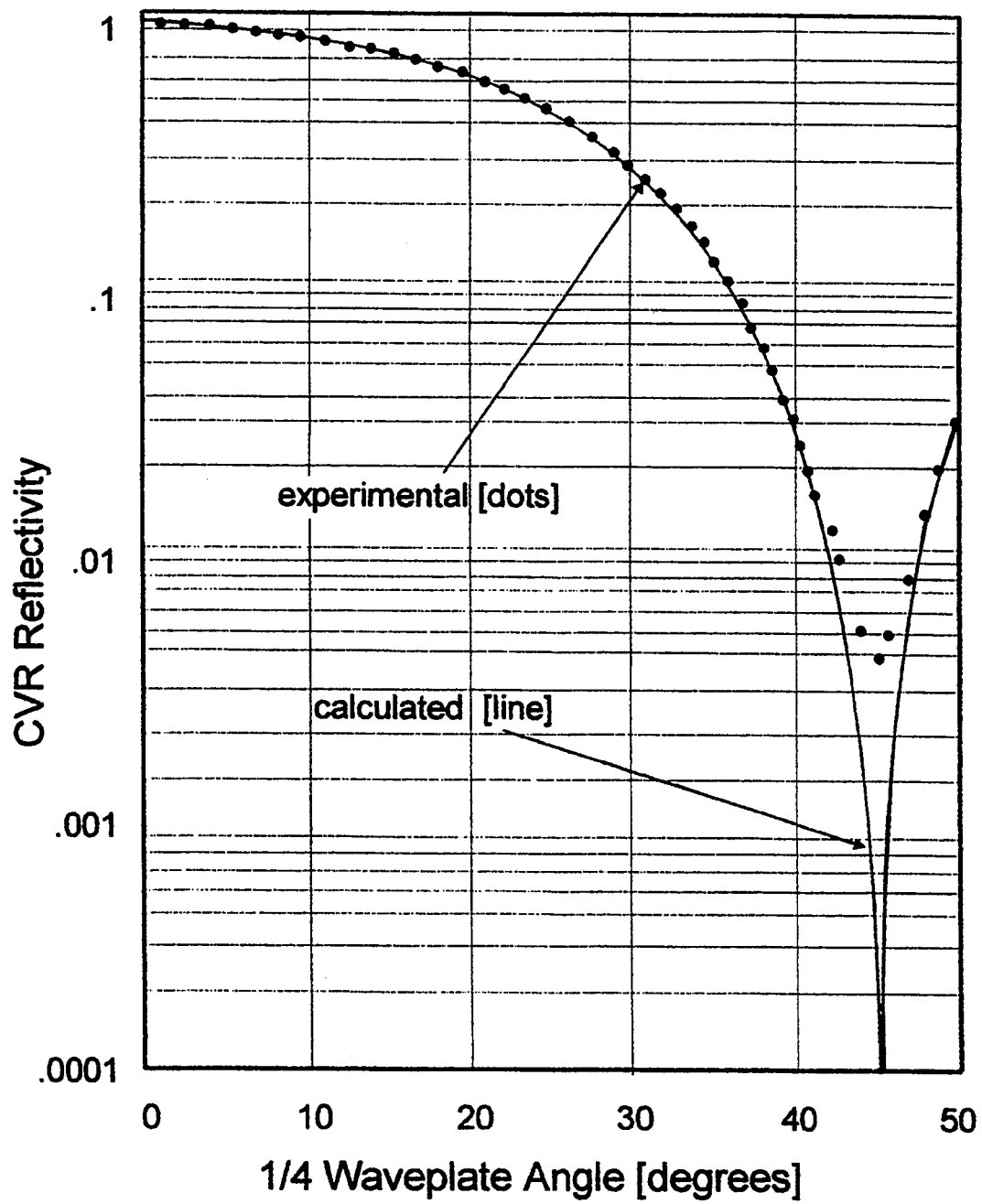
FIG. 3 is a graph comparing experimental and theoretical reflectivity values.

The dynamic range of CVR is limited by the polarization performance of the ¼ waveplate 14 and the polarizer 16. The CVR is calibrated using a cw 1 micron laser, a highly reflecting mirror in the CVR, and a beam splitter in front of the CVR which measures the amount of reflected light. The calibration data and calculated reflectivities are shown in FIG. 3. Excellent agreement between the calculated and measured values were obtained down to reflectivities of $10^{-2}$, deviations in reflectivity below $10^{-2}$ are attributed to the ¼ waveplate's 14 optical performance since calcite was used as the polarizer material. The polarizability of calcite is typically good to $10^{-5}$. For the polarizer/waveplate combination, the reflectivity varied between $3 \times 10^{-3}$ and 1.0 giving us nearly 3 orders of magnitude dynamic range. Reflectivities of $10^{-7}$ were achieved by choosing the appropriate neutral density filter 18 and mirror 12 reflectivity combination. Reflectivities between $10^{-6}$ to $10^{-4}$ were typically used in our experiments.

The CVR reflectivity is conveniently chosen by rotating the ¼ waveplate 14 using a precision rotation stage with a vernier. The range of reflectivity is selected by choosing the appropriate neutral density filter 18.

Parasitic lasing is quantified by creating a parasitic oscillator using the CVR as the output coupler. By precisely controlling the reflectivity of the CVR the parasitic threshold reflectivity can be determined. Since this technique is suitable for fine control, the laser system must be optically aligned reasonably well and the laser system must be operated with the Q-switch, or other timing control optic, disabled to prevent stimulated emission. Typically the laser is operated alternately between the lasing and non-lasing mode to verify the system's overall performance and allow for parasitic minimization respectively.

The CVR is used to assemble and optimize a large laser system for maximum parasitic suppression. The laser system is assembled by iteratively adding optical components to the system, and then finding parasitic threshold by adjusting the CVR to maintain parasitic threshold. Adding additional gain to the system would also directly change the parasitic threshold. A detector 10 placed behind the CVR's mirror 12 is used to identify the presence, or absence, of stimulated emission with sensitivities down to the pico-joule range. The measured parasitic threshold immediately allows evaluation of the impact which additional optical components, gain, or alignment has on parasitic lasing. Limiting the parasitic oscillator to operation near threshold is necessary to prevent optical damage. Parasitic energies need not exceed the microjoule range. Quantification of parasitic lasing is achieved by measuring the absolute value of parasitic threshold reflectivity and comparing it with an analytical oscillator model as the system is assembled. At each step of the process, the added optical components can be aligned for maximum parasitic resistance.

The parasitic oscillator's threshold condition can be written in the following generalized form:

$$[G_T T_p T_c]^2 T_f T_r R_{oc} = 1 \qquad (2)$$

where:
- $G_T$ is the system's total small signal gain. [single pass]
- $T_p = 1-L$, where L represents all passive losses due to surface reflections and absorption. [single pass]
- $T_c = 1-L_d$, where $L_d$ represents diffraction losses in the parasitic resonator.
- $T_f$ represents the forward transmission of parasitic light through the system between the HR of the system and the CVR output coupler.
- $T_r$ represents the reverse transmission of parasitic light from the CVR to the system's effective HR mirror.
- $R_{OC} = R_{CVR}$, which is the parasitic oscillator's output coupler reflectivity.

The difficulty In evaluating equation 2 will depend on the complexity of the laser system being studied. The total small signal gain $G_T$ of the system is measured using CW or pulsed lasers and is a critical parameter in the laser design. The passive losses $T_p$, are simply the multiplication of the reflective and constant absorptive losses. The parasitic resonator losses $T_c$ expressed in terms of single-pass transmission, is related to the Fresnel number of the parasitic oscillator. This term can be unity if the radius of curvature of the CVR and thermal lensing are considered.

The forward and reverse resonator transmissions depend on the particular laser system being considered. They are also more complicated to evaluate since they contain many hidden parameters such as thermally induced birefringence. Thermally induced birefringence manifests itself as an additional loss when propagated through a polarizer. In general, two independent equations representing parasitic lasing in orthogonal polarizations must be considered. If the laser system has polarization sensitive elements, for example a polarizing beamsplitter or even a non-normal incidence dichroic mirror, one polarization will have a lower parasitic threshold. By adjusting the CVR's polarizer 16, parasitic lasing in any polarization is evaluated.

The forward transmission includes terms such as the transmission of active electro-optic devices, Faraday Isolators, polarizing beamsplitters, and other transmission terms which are sensitive to electrical and optical alignment. The forward terms are generally related to the efficiency of the system and are therefore usually maximized.

The reverse transmission of the laser system contains similar terms to the forward transmission. In addition, terms related to the optical isolation system are characterized here as a reverse transmission. These terms are often very sensitive to alignment and polarization. The reverse transmission of a Faraday Isolator or electro-optic Q-switch is intimately related to polarization and alignment. Isolator performance and thermally induced birefringence can each be quantified using independent test setups before assembling the entire laser system.

Equation 2 can be rewritten as $$R_{OC} = 1/G_T T_p T_c]^2 T_f T_r. \qquad (3)$$

The controlled retro-reflection technique establishes the parasitic resonator. The threshold reflectivity basically measures $R_{oc}$. Any changes in the circulating parasitic optical power, represented in the denominator of eq. 3, can be immediately measured as changes in $R_{oc}$.

If the gain of the system can be controlled, the controlled retroreflection feedback technique can be used to quantify and maximize parasitic suppression. For fielded systems where the thermal mechanical changes are severe, this technique might provide an additional margin of parasitic suppression.

The circulating optical power inside the parasitic resonator can be significantly altered with the addition of active and passive optical components. By minimizing parasitic lasing with the entire system operational, it is possible to compensate for a number of effects such as thermal lensing, thermal beam steering, and thermally induced birefringence which significantly alter the circulating parasitic power. Optical beam steering due to thermal lensing changes the optical alignment and is very hard to compensate for without dynamically aligning the system for parasitic suppression. The addition of optical surfaces to the system can provide reflectivity for parasitic mirrors, or provide additional passive losses. Polarization rotating devices such as waveplates and electro-optic components can dramatically affect the circulating parasitic energy. This approach presumes that parasitic lasing can be controlled by adjusting the gain or loss of the system, and that the components are optically aligned, needing only very fine adjustments to suppress parasitic lasing. The CVR is used to interrogate the parasitic threshold.

The procedure for setting up the CVR for controlled retro-reflection is relatively straight forward. Great care must be exercised to prevent parasitic lasing build up beyond the micro-joule range.

The steps are:
a. Calibrate the CVR using a CW or pulsed laser.
b. Optically align the laser system. Adjust system gain so that no parasitic lasing is detected.
c. With the CVR at minimum reflectivity, align the retro-reflect back into the laser system using an alignment laser or other safe technique. [rough alignment]
d. Place detector behind CVR mirror and increase reflectivity until a single laser spike is observed on the detector.
e. Complete alignment of the CVR mirror by gimbal adjustment of the mirror while maintaining the parasitic lasing near single-spike threshold by adjusting the gain.

Once the CVR is aligned with respect to the laser, various tests can be performed to optimize and quantify the laser system. The laser system can be interrogated in various ways by changing the optical alignment of components such as the Q-switch hold-off optics, Faraday Isolator polarization optics, and optical surface orientations. By maintaining single-spike parasitic lasing, the laser energy will be very small and the absolute value of the threshold reflectivity quantifies any changes to the parasitic oscillator. Great care must be taken during optical adjustments to allow only 1-3 parasitic laser spikes to occur in order to minimize parasitic energy and prevent severe optical damage.

Neutral density filter adjustments to the CVR are generally needed to achieve the large range of reflectivities between the beginning alignment and the final optimization position. All components except the mirror must be operated off-axis in order to prevent potentially harmful reflections.

EXAMPLE

This technique was used to minimize, understand and model parasitic lasing for a space-based lidar system capable of accurately measuring atmospheric aerosols. The space-based lidar requires the simultaneous generation of three wavelengths, 1064, 532, and 355 nanometers, with minimum output energies of 200, 400, and 150 millijoules, respectively. Parasitic lasing of less than 100 picojoules is required to maintain lidar data integrity. The laser transmitter must be thermally and mechanically rugged, efficient, compact and able to withstand launch and space conditions. Initial test laser experiments revealed the need for a laser oscillator design and system architecture which minimizes parasitic lasing.

Figure 4:
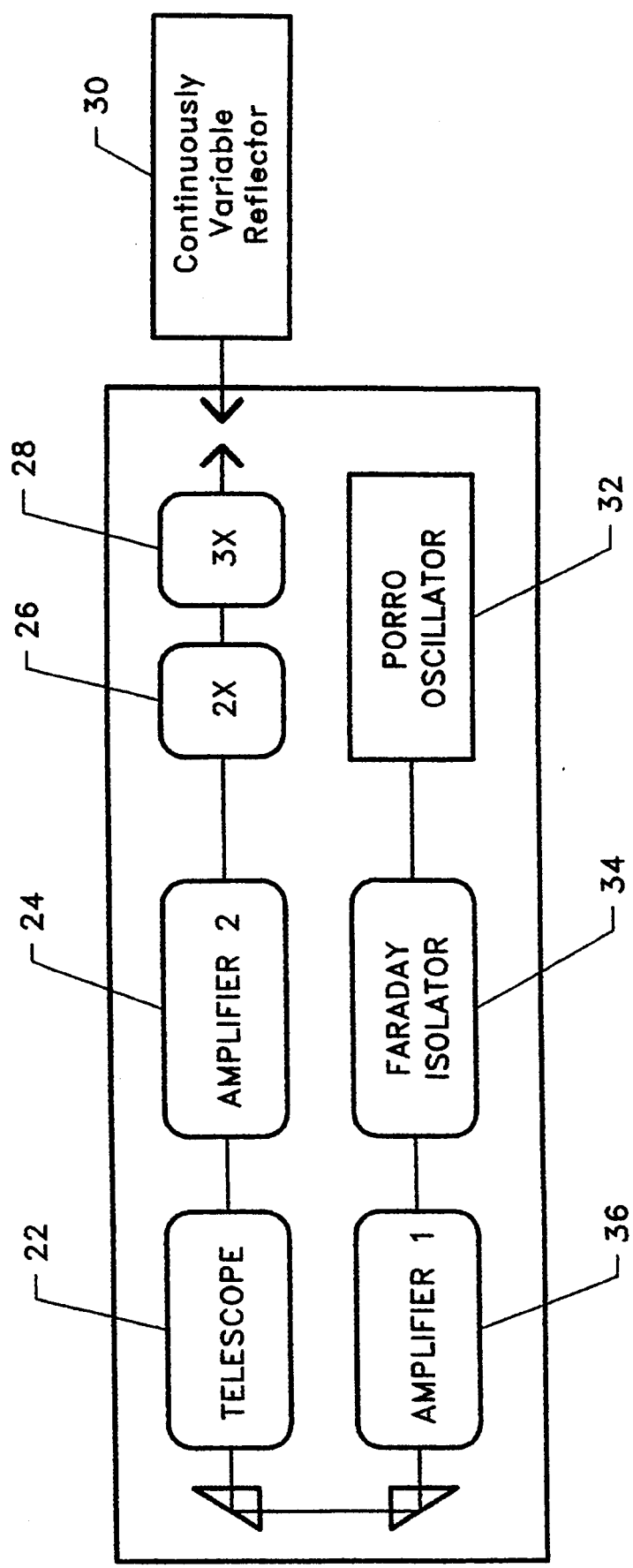
FIG. 4 is a diagram of a laser system.
Figure 5:
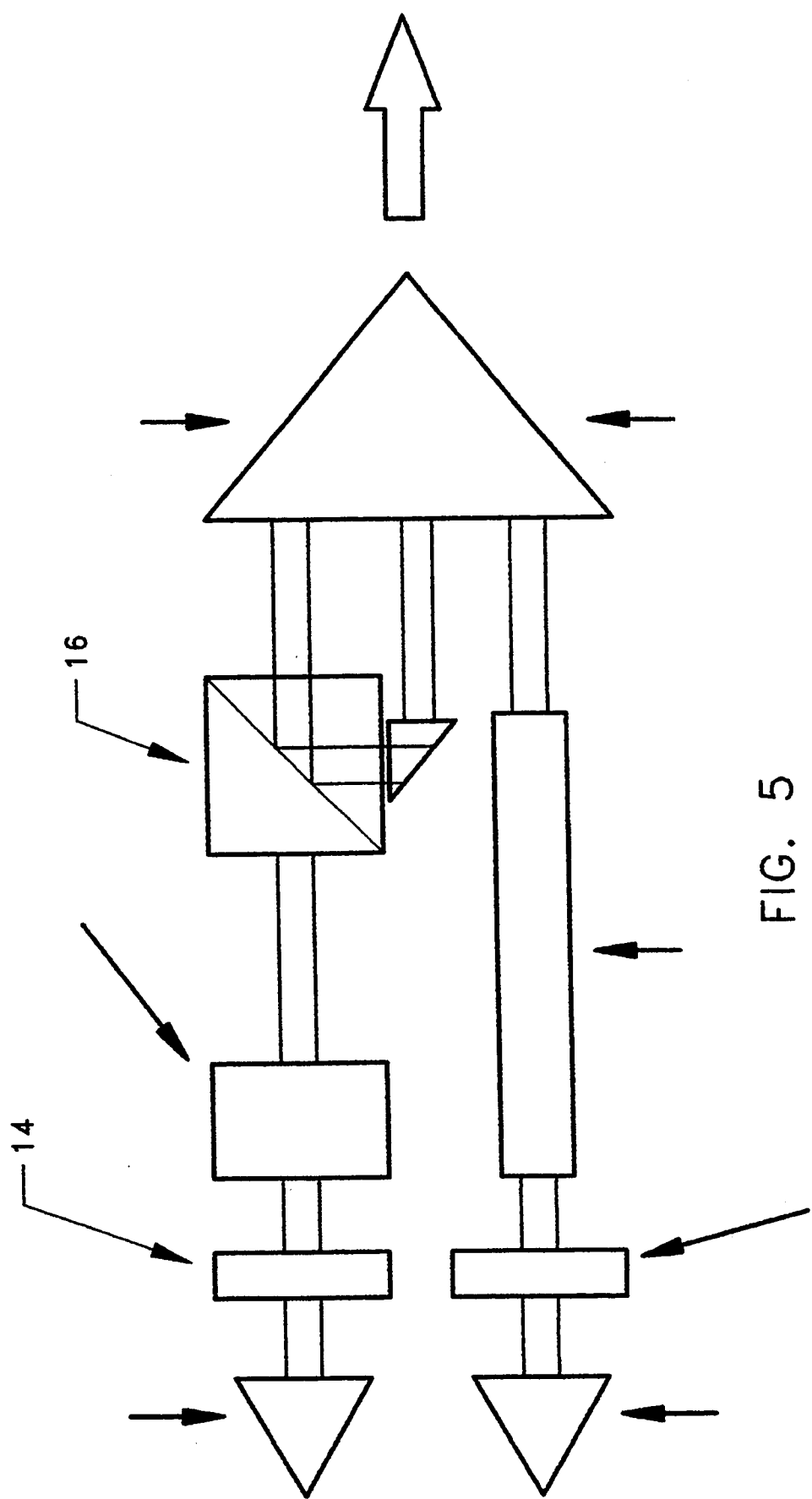
FIG. 5 is a diagram of the oscillator in FIG. 4.
Figure 6:
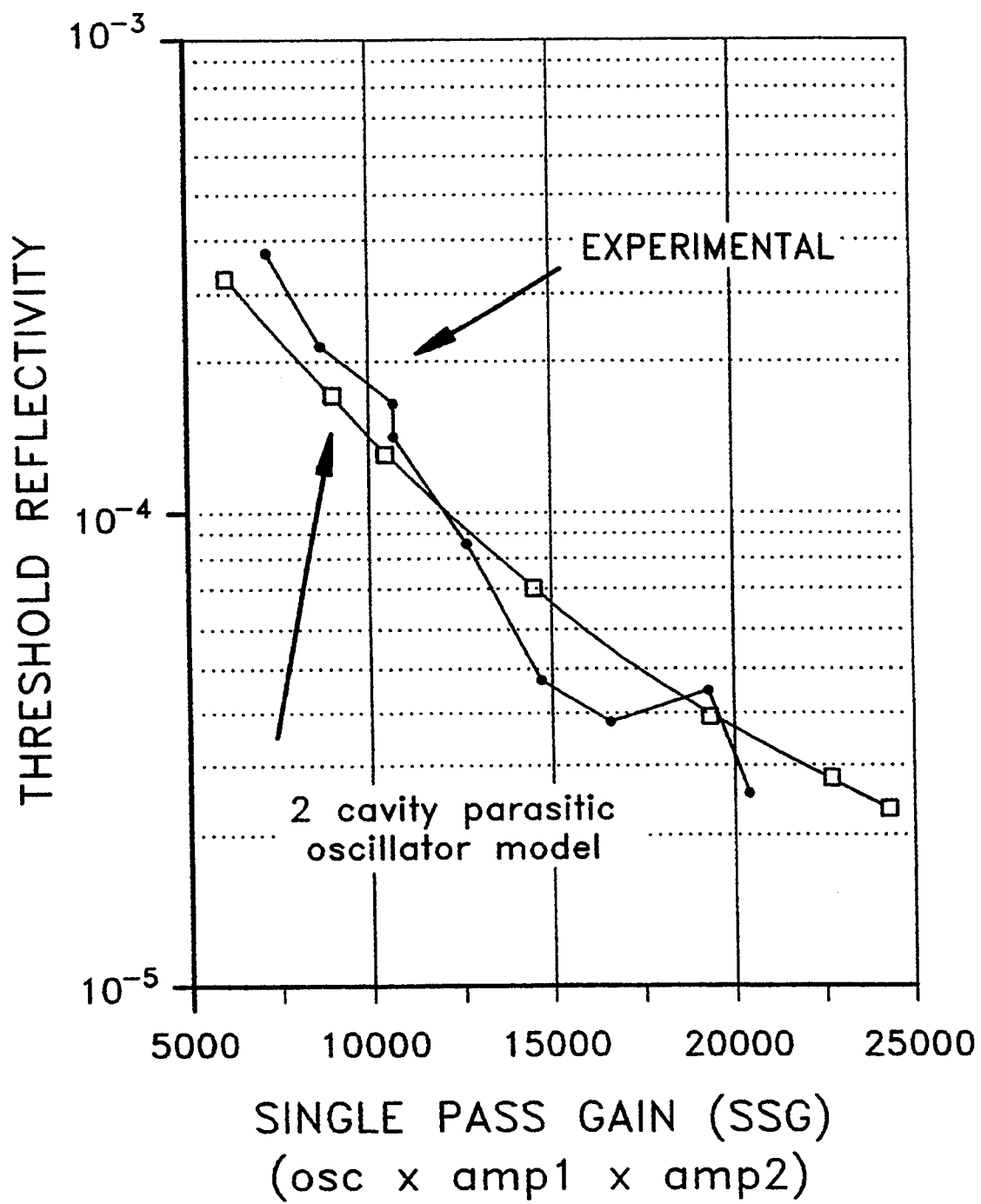
FIG. 6 is a graph comparing experimental and theoretical gain values.
Figure 7:
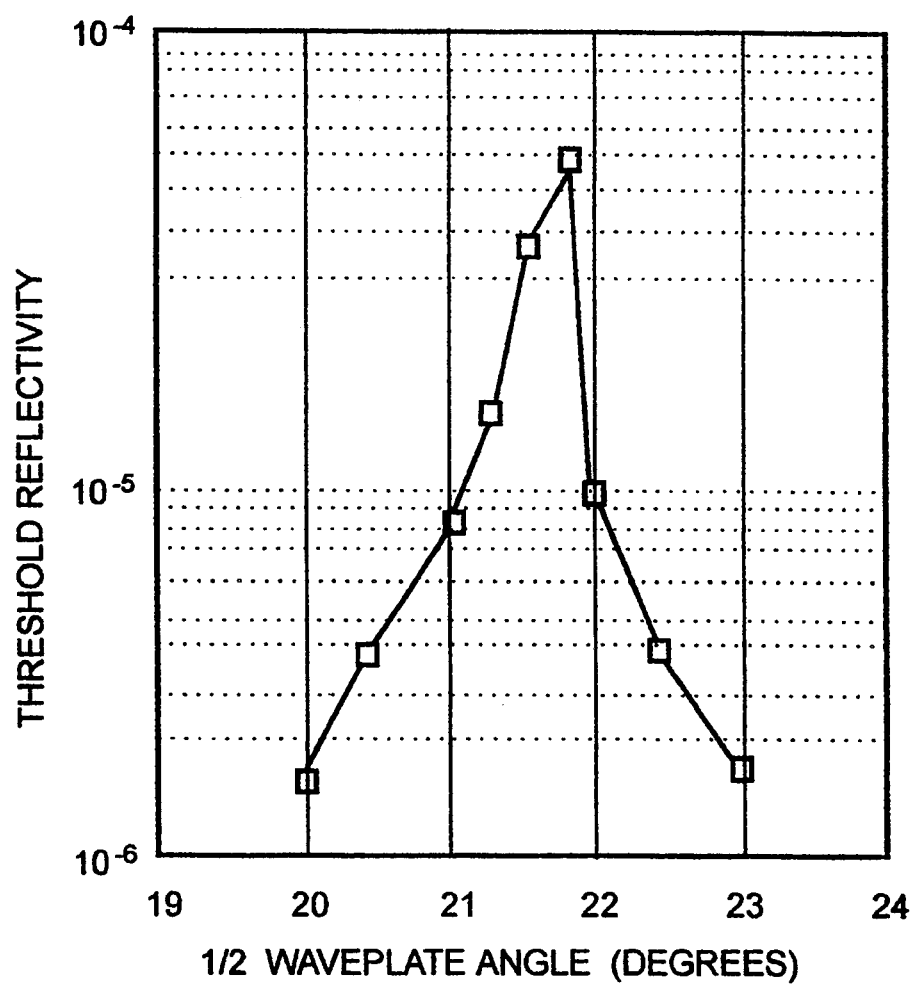
FIG. 7 is a graph showing reflectivities at different waveplate rotations.

A Nd:YAG laser must operate at the 1.4–1.5 joule level in order to meet the energy specifications for the 300 km aerosol measurement at all 3 wavelengths. The laser architecture is shown in FIG. 4. A Porro oscillator is used because of its demonstrated resistance to optical misalignment. This is an important consideration since the laser must survive and function in the space-shuttle environment. The Porro design features (see fig.5) include nearly crossed roof prisms and a cornercube reflector which form the basic resonator. The laser is Q-switched using a Pockels cell and waveplate combination which holds off laser action with no voltage applied, and acts like an HR mirror with applied voltage. The laser energy is polarization outcoupled. A second waveplate is used to control the outcoupling fraction, (i.e. the effective output coupler mirror reflectivity), which impacts the oscillator efficiency and internal optical power densities. In particular, a high outcoupling fraction (60–80%) is chosen to minimize internal optical component damage.

Parasitic lasing is very detrimental for the lidar application and is eliminated by very careful laser design. This parasitic prelasing is controlled by minimizing the circulating optical power inside the parasitic optical resonator. The single-pass, small signal gain through the oscillator 32, Amplifier 1 36, and Amplifier 2 24 was measured to be $2.7 \times 10^4$. This means there is a round trip gain of nearly $10^9$. The Porro oscillator 32 is designed such that parasitic light experiences double-pass gain and no attenuation through the oscillator 32. (The polarization could be rearranged to prevent this but not without penalties in circulating optical power or additional optical components). A Faraday Isolator 34 is used to help prevent circulating optical power by allowing polarized light to be transmitted in the forward direction but blocking the same polarized light in the reverse direction.

The optical Isolator 34 is a necessary, but not sufficient, condition for eliminating parasitic lasing. Even with the Isolator 34, stray, on-axis reflectivities on the order of $10^{-5}$ are sufficient for parasitic threshold to be reached. All optical components must be canted off-axis. A reflective beam expanding telescope 22 is used to minimize the on-axis first order reflections that otherwise would be present in a conventional refractive telescope. The reflective telescope 22 is also conveniently used to compensate for thermal lensing of the laser rods.

Although our invention has been illustrated and described with reference to the preferred embodiment thereof, we wish to have it understood that it is in no way limited to the details of such embodiment, but is capable of numerous modifications for many mechanisms, and is capable of numerous modifications within the scope of the appended claims.

I claim:

1. A device for reducing parasitic lasing, comprising:
   a high gain laser system which emits light;
   a continuously variable reflector for reflecting controlled, quantifiable amount of the emitted light back into the laser system creating a parasitic oscillation of the laser system; and
   a means for measuring the gain of the laser system.

2. A method for reducing parasitic lasing, comprising:
   calibrating a continuously variable reflector;
   optically aligning a laser system;
   adjusting the laser system gain such that no parasitic lasing is detected;
   setting the continuously variable reflector at a minimum reflectivity;
   retro-reflecting light into the laser system;
   aligning the retro-reflected light;
   increasing the reflectivity of the continuously variable reflector until a single laser spike is observed on an optical light detector;
   simultaneously adjusting the continuously variable reflector and the gain of the laser system such that reflectivity of the continuously variable reflector is minimized; and
   optically adjusting the laser system optics to maximize the reflectivity of the continuously variable reflector while maintaining a low light level on the optical light detector.

3. The method of claim 2 further including the step of:
   optically adjusting the laser system optics to maximize the reflectivity of the continuously variable reflector while maintaining a low light level on the optical light detector until the reflectivity of the continuously variable reflector is not less than the reflectivity of a reflector in an analytical oscillator model in order to quantify the parasitic lasing.

* * * * *